(12) United States Patent
Sukenari et al.

(10) Patent No.: US 7,525,595 B2
(45) Date of Patent: Apr. 28, 2009

(54) VISUAL PRESENTER

(75) Inventors: Kazuhiro Sukenari, Nagoya (JP);
Hiroshi Yamakose, Gifu (JP);
Yoshihiko Araya, Kariya (JP); Tetsuro Kato, Nagoya (JP)

(73) Assignee: Elmo Co., Ltd., Aichi (JP)

( * ) Notice: Subject to any disclaimer, the term of this patent is extended or adjusted under 35 U.S.C. 154(b) by 0 days.

(21) Appl. No.: 11/411,455

(22) Filed: Apr. 26, 2006

(65) Prior Publication Data
US 2007/0146653 A1 Jun. 28, 2007

(30) Foreign Application Priority Data
Dec. 27, 2005 (JP) ............... 2005-374609

(51) Int. Cl.
*H04N 5/222* (2006.01)
(52) U.S. Cl. .................. 348/373; 248/346.01
(58) Field of Classification Search ............ 248/346.1, 248/346.03, 122.1, 121, 187.1, 176.1; 348/373, 348/146; 353/120
See application file for complete search history.

(56) References Cited

U.S. PATENT DOCUMENTS

| | | | | |
|---|---|---|---|---|
| 4,825,295 A | * | 4/1989 | Ishikawa et al. | 348/836 |
| 4,939,580 A | * | 7/1990 | Ishikawa et al. | 348/373 |
| 4,963,986 A | * | 10/1990 | Fukuyama et al. | 348/347 |
| 5,247,330 A | * | 9/1993 | Ohyama et al. | 355/64 |
| 5,321,451 A | * | 6/1994 | Olugboji | 353/120 |
| 5,751,355 A | * | 5/1998 | Bito et al. | 348/375 |
| 5,863,209 A | * | 1/1999 | Kim | 434/428 |
| 2005/0237425 A1 | * | 10/2005 | Lee et al. | 348/373 |
| 2006/0077286 A1 | * | 4/2006 | Wenderski | 348/373 |

FOREIGN PATENT DOCUMENTS

JP 2004-056558 2/2004

\* cited by examiner

*Primary Examiner*—Ramon O Ramirez
(74) *Attorney, Agent, or Firm*—William L. Androlia; H. Henry Koda

(57) ABSTRACT

A visual presenter includes a body including a base and a support column on which an imaging camera is mounted, a stage which is separate from the body and is formed with a placement surface on which a material to be presented is placed, a positioner located on the base, and a positioned member located on the stage so as to be connectable to the positioner so that the placement surface falls within an imaging range of the imaging camera.

6 Claims, 9 Drawing Sheets

VISUAL PRESENTER

CROSS-REFERENCE TO RELATED APPLICATIONS

This application is based upon and claims the benefit of priority from the prior Japanese Patent Application No. 2005-374609, filed on Dec. 27, 2005, the entire contents of which are incorporated herein by reference.

BACKGROUND OF THE INVENTION

1. Field of the Invention

The present invention relates to a visual presenter which displays on a monitor, screen or the like a captured image of material placed on a placement surface of a stage.

2. Description of the Related Art

Conventional visual presenters include an integral type in which a support column on which an imaging camera is mounted is provided on a stage on which a material is placed. The conventional visual presenters also include another type in which a stage is provided with an insertion receptacle into which a support column is inserted. JP-A-2004-56558 discloses one of the latter type visual presenters.

However, the conventional visual presenters have no backlighting function and/or information cannot be written directly onto the placement surface of the stage in such a manner as in a whiteboard. As a result, an intended usage of the conventional visual presenters is limited depending upon the functions of the stage. Accordingly, different visual presenters need to be purchased according to the number of intended usages or a whiteboard needs to be placed on the stage. Thus, the conventional visual presenters have problems about economy, operability, usability and the like.

SUMMARY OF THE INVENTION

Therefore, an object of the present invention is to provide a visual presenter in which a plurality of stages are detachably attachable to the body according to intended usages and the body and stage can easily be positioned when the state is attached to the body.

The present invention provides a visual presenter comprising a body including a base and a support column on which an imaging camera is mounted, a stage which is separate from the body and is provided with a placement surface on which a material to be presented is placed, a positioner provided on the base, and a positioned member provided on the stage so as to be coupled to the positioner so that the placement surface falls within an imaging range of the imaging camera.

When the separate stage is coupled to the body in use, the positioned member formed on the stage is coupled to the positioner formed on the base, whereupon the placement surface of the stage falls within an imaging range of the imaging camera. Accordingly, when a plurality of stages are prepared which have different functions and are provided with the respective positioned members, the stages can be used according to the different usages. Consequently, a greater economy can be achieved. In this case, when the positioned member of the stage is just coupled to the positioner of the base, the stage can be positioned relative to the base. Consequently, the greater operability and usability of the visual presenter can be achieved.

In one embodiment, a center of an image captured by the imaging camera corresponds with a center of the placement surface of the stage when the positioned member is coupled to the positioner. When the positioned member is coupled to the positioner, the center of the image captured by the imaging camera corresponds with the center of the placement surface of the stage. Accordingly, a material can readily be placed on the placement surface and the imaging camera can be adjusted upon start of use thereof. Consequently, the greater operability and usability of the visual presenter can be achieved.

In another embodiment, the visual presenter further comprises a magnet generating an attraction force coupling the positioned member to the positioner. Since the coupling of the positioned member to the positioner is carried out by the attraction force of the magnet, the coupling can be rendered easier and quicker.

In further another embodiment, the visual presenter further comprises a backlight illuminating the placement surface of the stage from behind the placement surface. Furthermore, the placement surface comprises a whiteboard. Consequently, the different stages can be used according to various usages.

In further another embodiment, the stage is foldable. Consequently, the visual presenter can be improved in the portability and accommodation facility.

BRIEF DESCRIPTION OF THE DRAWINGS

Other objects, features and advantages of the present invention will become clear upon reviewing the following description of the embodiment with reference to the accompanying drawings, in which.

DETAILED DESCRIPTION OF THE INVENTION

Figure 1:
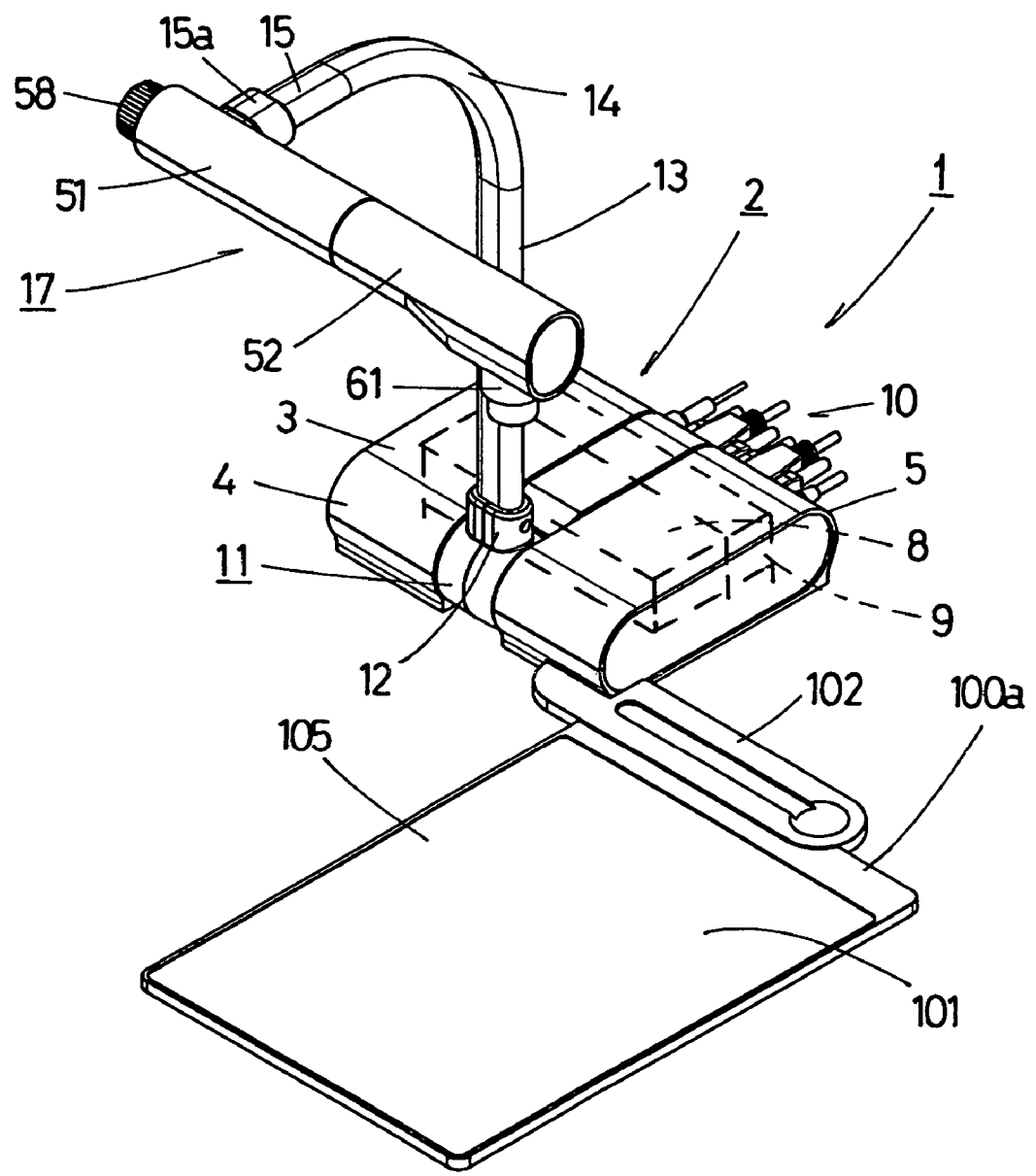
FIG. 1 is a perspective view of a visual presenter in accordance with one embodiment of the present invention.
Figure 11:
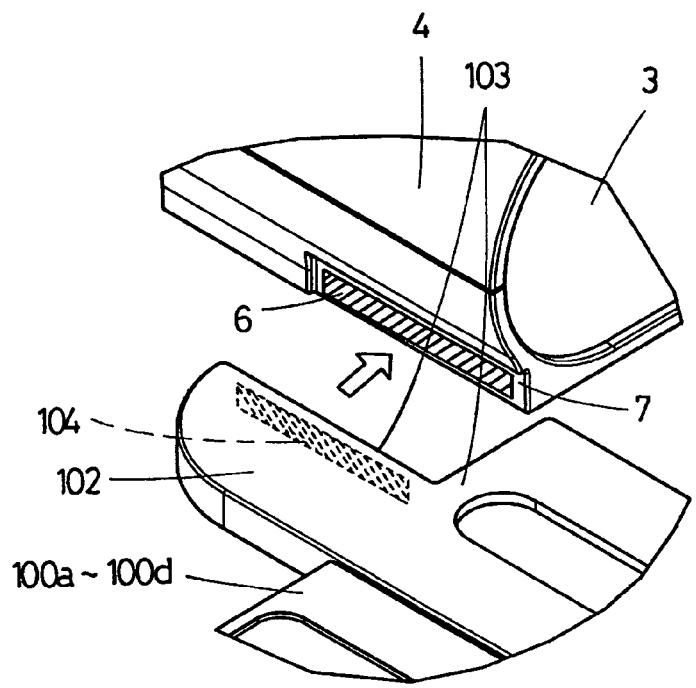
FIG. 11 is a perspective view of a positioner and a positioned member.

One embodiment of the present invention will be described with reference to the accompanying drawings. Referring to FIG. 1, a visual presenter 1 of the embodiment is shown. The visual presenter 1 comprises a body 2 and a stage 100a coupled to the body 2. The body 2 includes a base 3, a support column 13 and an imaging camera 17. The base 3 is formed into a rectangular shape and has a front 4 and a rear 5 both of which have curved faces. A positioner 7 is formed in a corner of a lower edge of the front 4 as shown in FIG. 11. The positioner 7 includes a magnet piece 6 affixed thereto.

A control circuit unit 8 and a weight 9 are enclosed in the base 3. The weight 9 prevents the rear 5 side of the base 3 from rising when the support column 13 is inclined frontward. Furthermore, various connecting sockets 10 and the like are provided on the rear 5 of the base 3 for ensuring electrical connection between external equipment and the visual presenter 1. A pivot shaft 11 is pivotally mounted on substantially a central part of the curved surface 4 side of the base 3. The pivot shaft 11 has an upper surface on which a support column mounting portion 12 is formed.

The support column 13 is inserted into the mounting portion 12 so as to stand. The support column 13 is hollow and accordingly, wire harness (not shown) is inserted through the support column 13. A curved portion 14 is formed on the support column 13. The curved portion 14 has a distal end on which a horizontal portion 15 protruding in such a direction that the horizontal portion 15 is spaced away from the front 4 of the base 3. Furthermore, the horizontal portion 15 has a distal end on which a coupling part 15a is mounted. The coupling part 15a also has a distal end on which a hollow pivot shaft 16 formed. An imaging camera 17 is pivotally mounted on the hollow pivot shaft 16.

Figure 2:
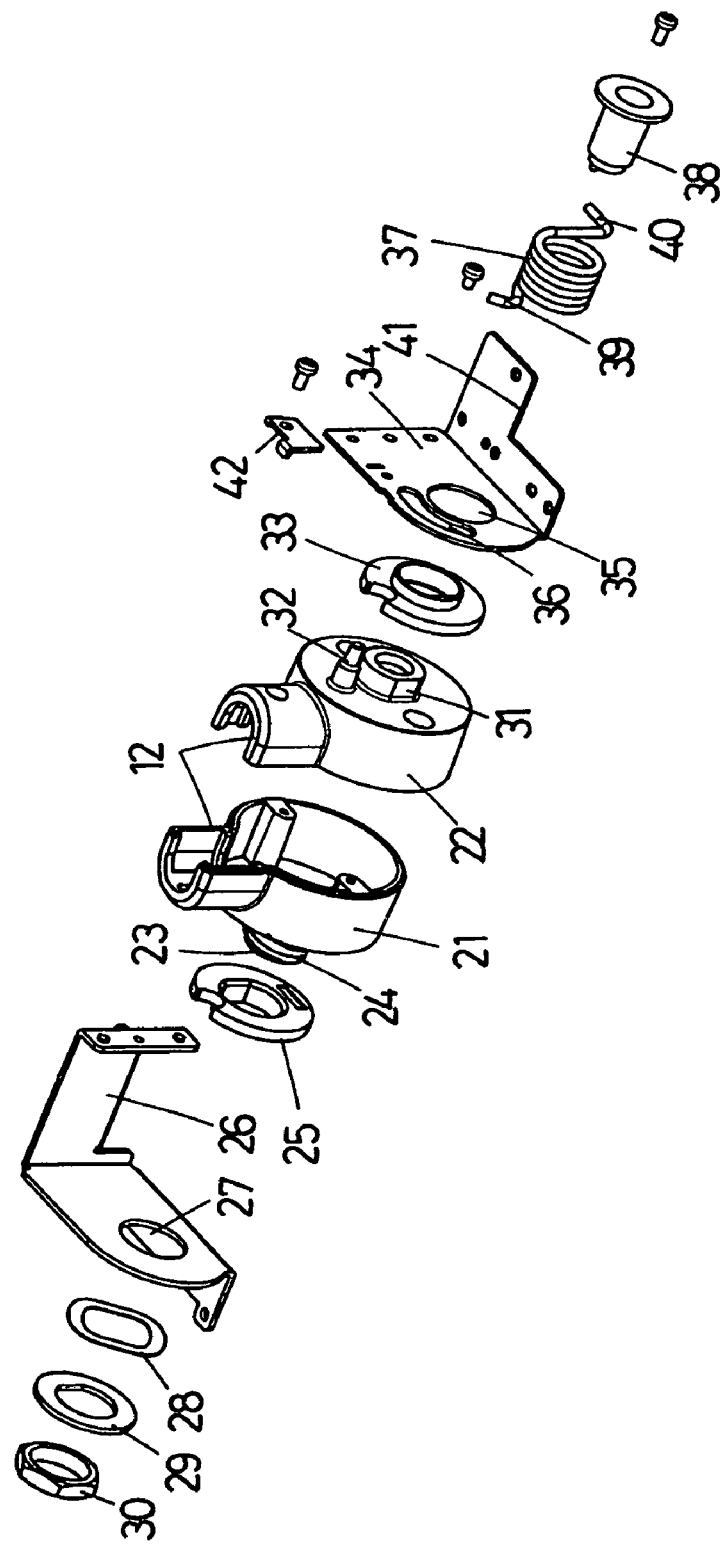
FIG. 2 is an exploded perspective view of a pivot shaft.
Figure 3:
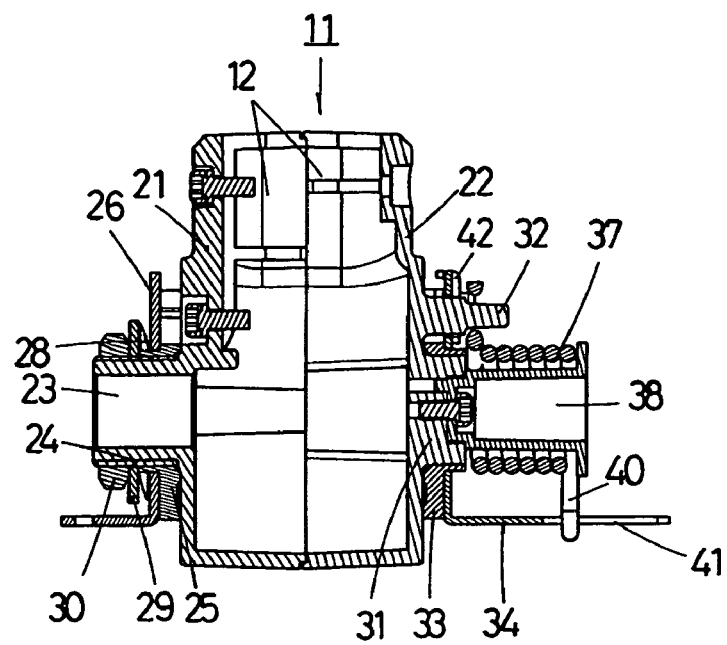
FIG. 3 is a sectional view of the pivot shaft.
Figure 4:
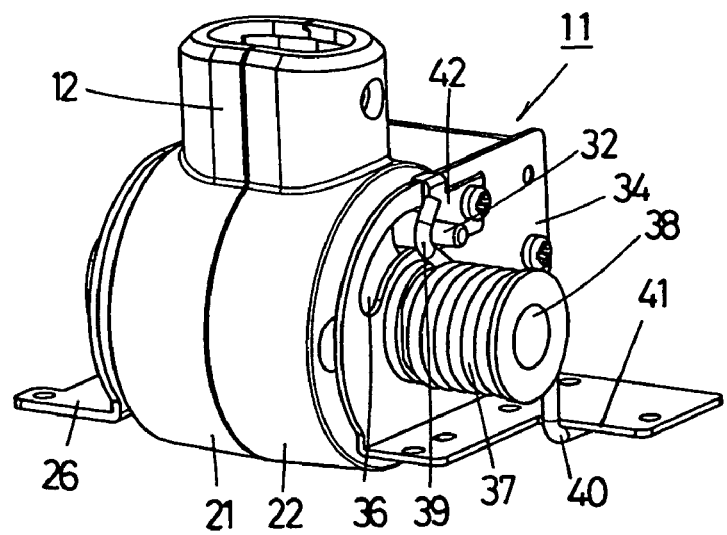
FIG. 4 is a perspective view of the pivot shaft.

Referring now to FIGS. 2 to 4, the pivot shaft 11 includes two left and right members 21 and 22 integrated together. The members 21 and 22 are made from aluminum by die-casting. The left member 21 is formed with a hollow shaft 23. The hollow shaft 23 has a distal end on which a male screw 24 is formed. The hollow shaft 23 is inserted through a shaft support hole 27 of the bracket 26 fixed in the base 3 with a spacer 25 being fitted on the male thread 24. A corrugated washer 28 and a flat washer 29 are fitted on a part of the hollow shaft protruding from the shaft support hole 27. The corrugated washer 28 and a flat washer 29 are tightened up against the bracket 26 by a nut 30.

A right-hand member 22 includes a shaft 31 and a spring-holding pin 32 both formed on a right sidewall thereof, as shown in FIG. 2. The shaft 31 is inserted through a shaft hole 35 of a bracket 34 fixed in the base 3 with a spacer 33 being interposed therebetween. The spring-holding pin 32 is inserted through an arc hole 36 formed in the bracket 34 so as to be concentric with the shaft hole 35. The shaft 31 has an end to which a shaft 38 with a return spring 37 is fixed.

The return spring 37 has one end formed with a hook 39 hooked on the pin 32 and the other end also formed with a hook 40 which is hooked on a spring hook 41 of the bracket 34. The return spring 37 imparts a turning force on the support column 13 standing on the mounting portion 12 in such a direction that the support column 13 rises from a forwardly-leaning position. The bracket 34 is provided with a stopper 42 controlling the rising state of the support column 13 against which the pin 32 abuts.

Figure 5:
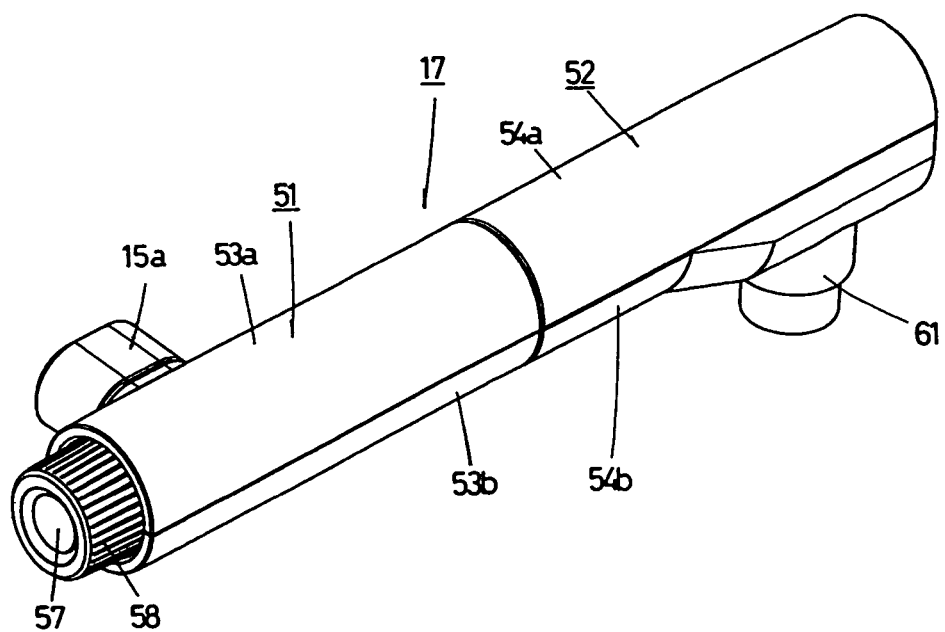
FIG. 5 is a perspective view of an imaging camera.
Figure 6:
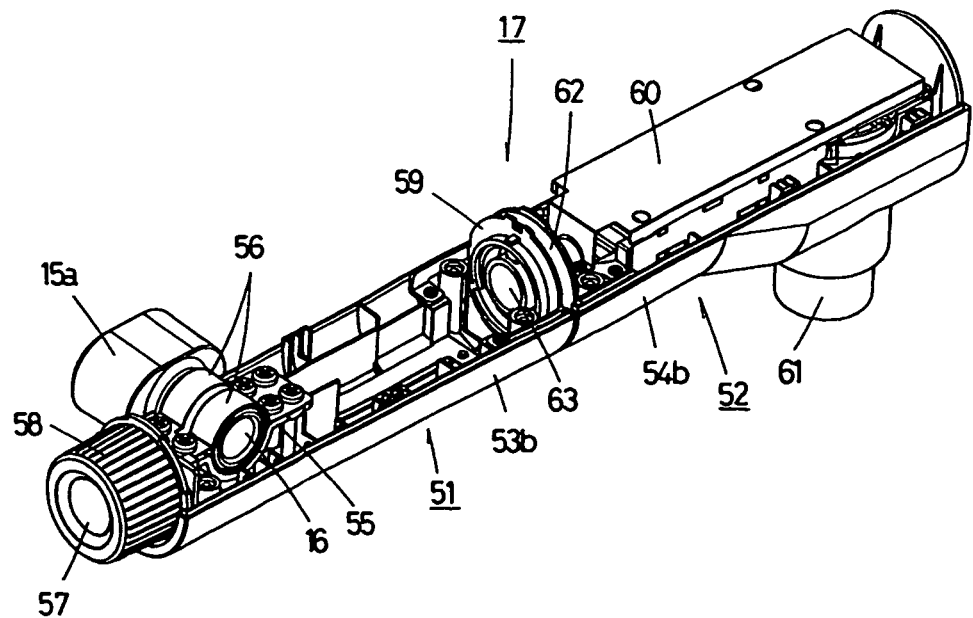
FIG. 6 is a perspective view of an interior of the imaging camera.
Figure 7:
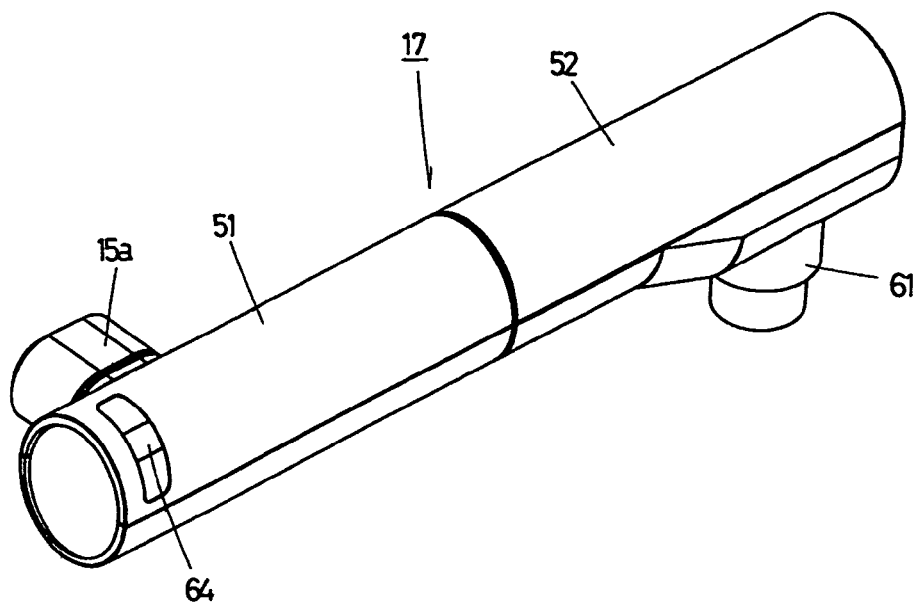
FIG. 7 is a perspective view of another example of the imaging camera.

Referring now to FIG. 5, an imaging camera 17 comprises a slender shaft support 51 and a slender camera head 52. The shaft support 51 includes upper and lower two-split cylindrical cases 53a and 53b both made of a synthetic resin. The camera head 52 also includes upper and lower two-split cylindrical cases 54a and 54b both made of a synthetic resin.

Figure 8:
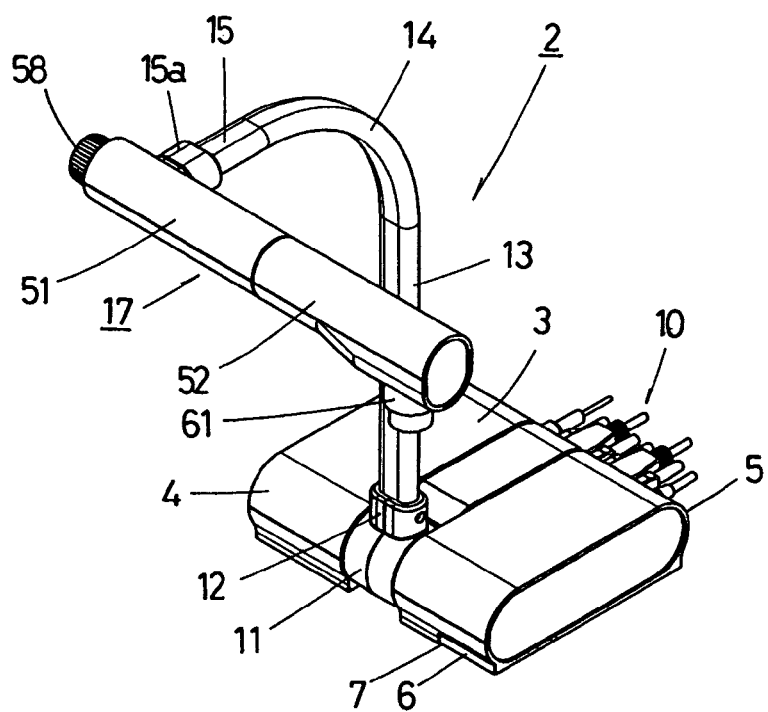
FIG. 8 is a perspective view of the body of the visual presenter when the imaging camera is in a horizontal position.
Figure 9:
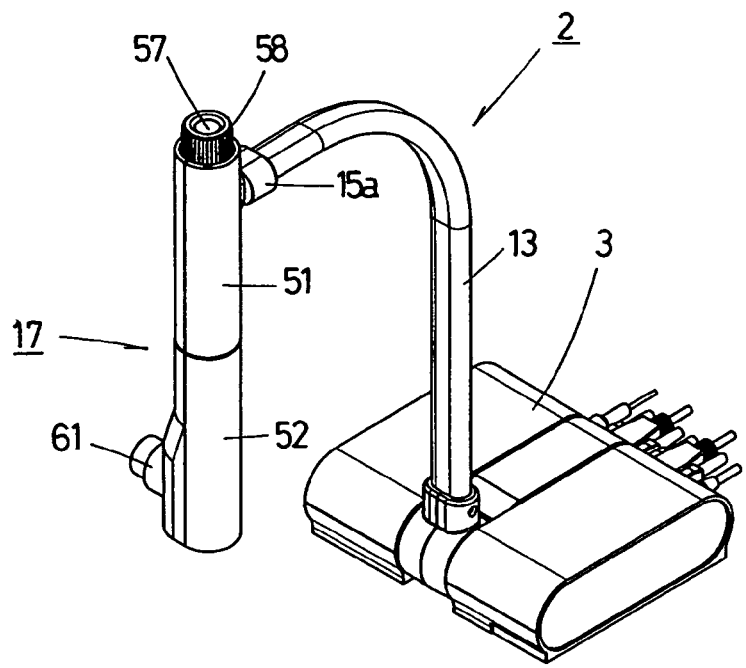
FIG. 9 is also a perspective view of the body of the visual presenter when the imaging camera is in a vertical position.

A pivot shaft 16 is mounted on a distal end of the horizontal part 15 of the support column 13. The pivot shaft 16 is inserted into a hole (not shown) formed in a proximal end of the lower case 53b. The pivot shaft 16 is pivotally mounted on a pivot bearing 55 by a clamping piece 56 screwed to the bearing 55 provided on the case 53b. A stopper (not shown) is provided case 53b for limiting a pivoting angle of the pivot shaft 16 to 90 degrees. A detent mechanism (not shown) is provided between the case 53b and the pivot shaft 16 for offering a crisp feel at every 90-degree pivot. Accordingly, the imaging camera 17 can be pivoted from a horizontal position, as shown in FIG. 8, to a vertical position, as shown in FIG. 9. A zoom dial 58 with a centrally incorporated autofocus button is rotatably mounted on a proximal end of the case 53b. A coupling shaft bracket 59 is mounted on a side end opposite to the zoom dial 58.

A camera control circuit unit 60 for the imaging camera 17 is mounted on the lower case 54b of the camera head 52. A lens barrel 61 is formed on a lower distal end of the case 53b so as to protrude. A coupling shaft bracket 62 is mounted on the proximal end of the case 54b. A hollow coupling shaft 63 is inserted between the bracket 59 of the case 53b and the bracket 62 of the case 54b. The camera head 52 is pivotally coupled to the shaft support 51 by the coupling shaft 63. The imaging cameral 17 may comprise an operation knob 64 or the like, instead of the zoom dial 58.

Figure 10:
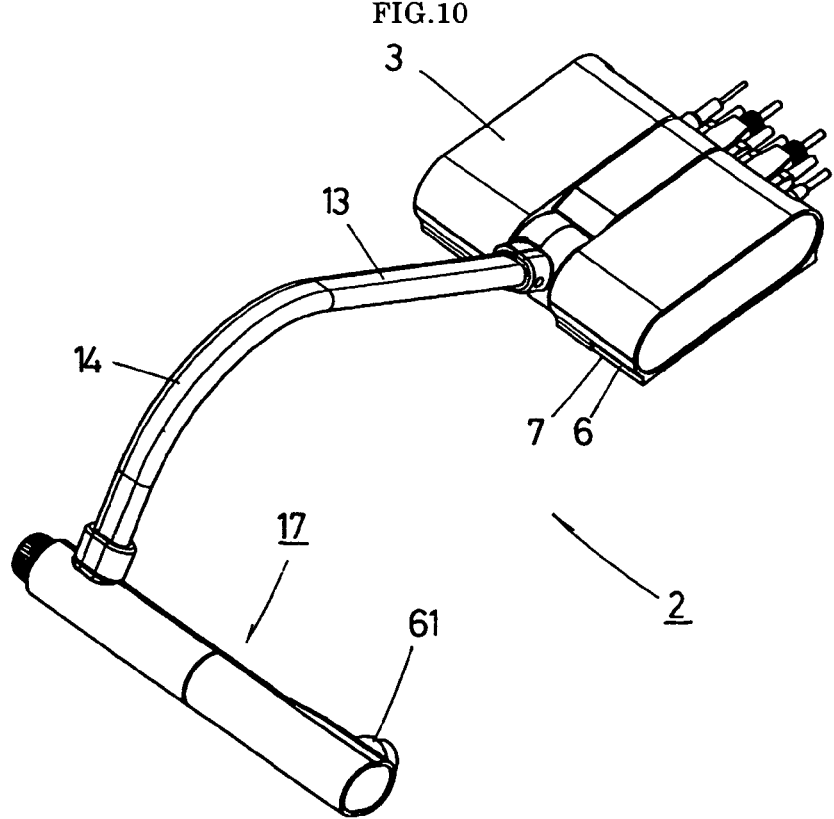
FIG. 10 is further a perspective view of the body.

The control circuit unit 8 disposed in the base 3, the camera control circuit unit 60 and the zoom dial 58 with incorporated autofocus button 57 and the like are electrically connected to one another. A wire harness ensuring the electrical connection is arranged through the hollow shaft 23 of the pivot shaft 11, the support column 13, the hollow pivot shaft 16 and the coupling shaft 63. The above-described body 2 is caused to pivot about the pivot shaft 16 of the pivot shaft support 51 of the imaging camera 17 from the steady state as shown in FIGS. 1 and 8, so tat the body 2 can be changed from the horizontal state to the vertical state and to the state where the column 13 is leaned forward as shown in FIG. 10.

When the column 13 is leaned forward, the weight 9 disposed in the base 3 prevents the rear 5 side of the base 3 from rising. Furthermore, a nut 30 applies a braking force via the washers 28 and 29 to the pivot shaft 11 between the brackets 26 and 34. Additionally, the return spring 37 biases the shaft 31 of the pivot shaft 11 in such a direction that the forwardly leaned support column 13 rises. Accordingly, when pivoting moment of the column 13 with the imaging camera 17 mounted thereon, the clamping force of the nut 30 and a biasing force of the return spring 37 are adjusted so as to become head-to-head or substantially equal to one another, the support column 13 can be stopped at any forward lean angle, that is, a free stop mechanism can be provided. Furthermore, when the column 13 is returned from the forward leaning state to the rising state, the column 13 can easily be caused to rise with assistance of the biasing force of the return spring 37.

FIGS. 12 to 15 exemplify stages 100a to 100d coupled to the body 2 in use. Each stage has an upper surface or placement surface 101. Furthermore, each stage has a front edge formed with a positioned member 102 coupled to the positioner 7 of the base 3. The positioned member 102 is formed with a right-angled estimation portion 103 which has one side on which a magnetic piece 104 is affixed.

The aforesaid positioner 7 and the positioned member 102 are coupled together by an attractive force of the magnet. In this case, the right-angled corner of the base 3 abuts against the estimation portion 103 so that the placement surfaces 101 of the stages 100a to 100d are positioned so as to correspond to an imaging range of the imaging camera 17 in the normal state of the body 2 and so that a central part of the placement surface 101 corresponds to a central part of the imaging range of the imaging camera 17.

Figure 12:
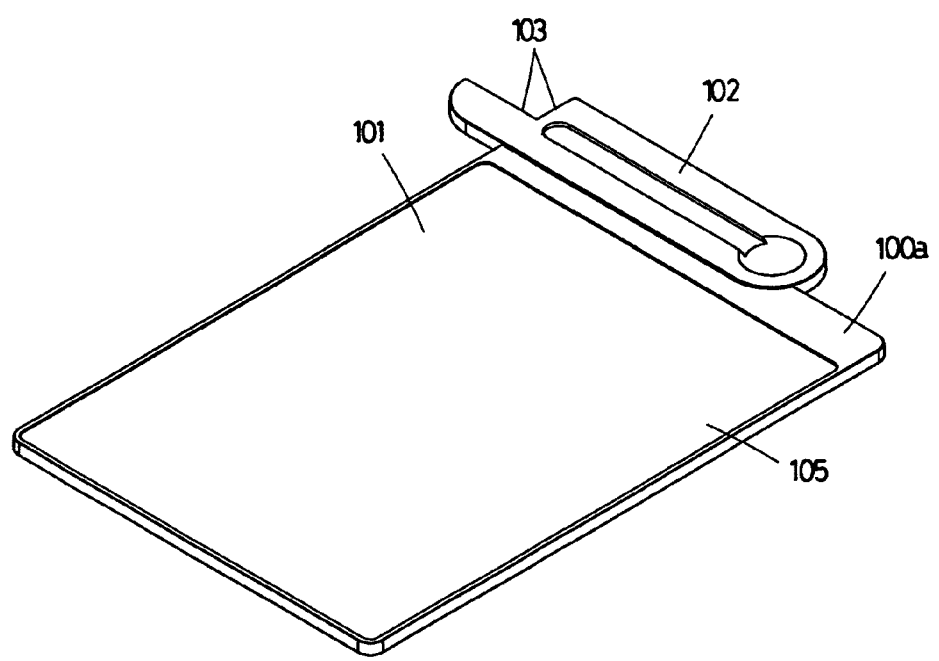
FIG. 12 is a perspective view of one form of the stage.
Figure 13:
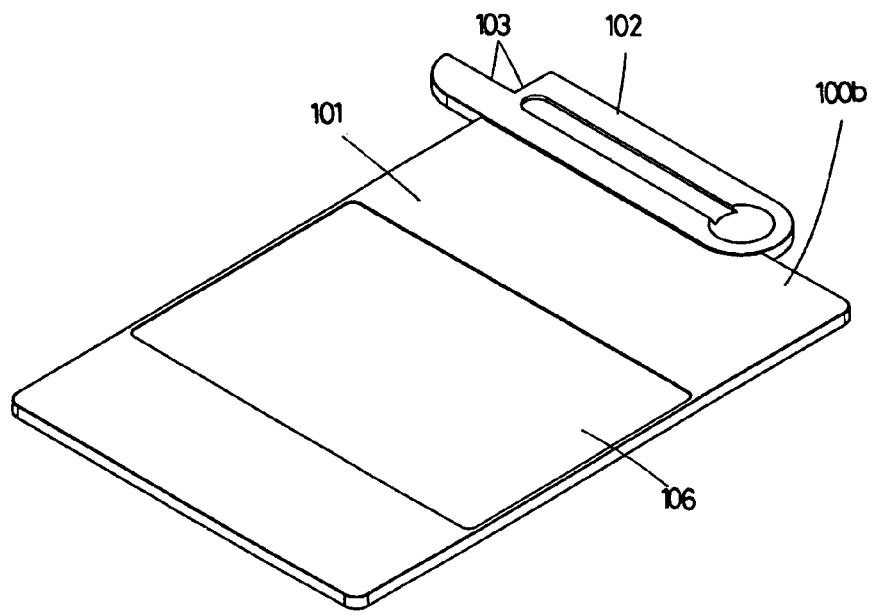
FIG. 13 is a perspective view of another form of the stage.
Figure 14:
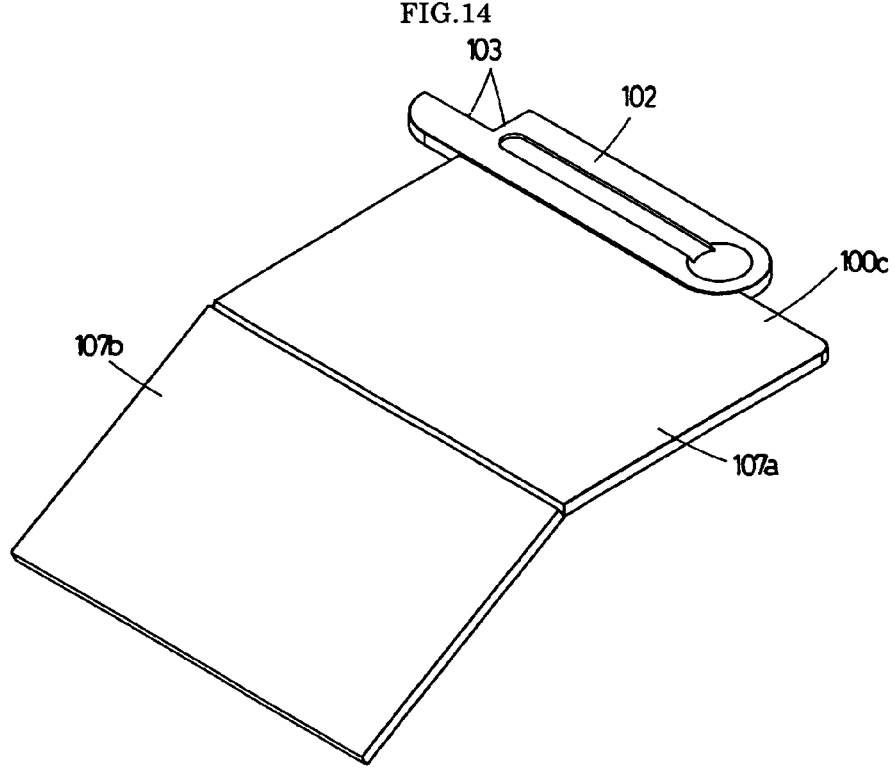
FIG. 14 is a perspective view of further another form of the stage.
Figure 15:
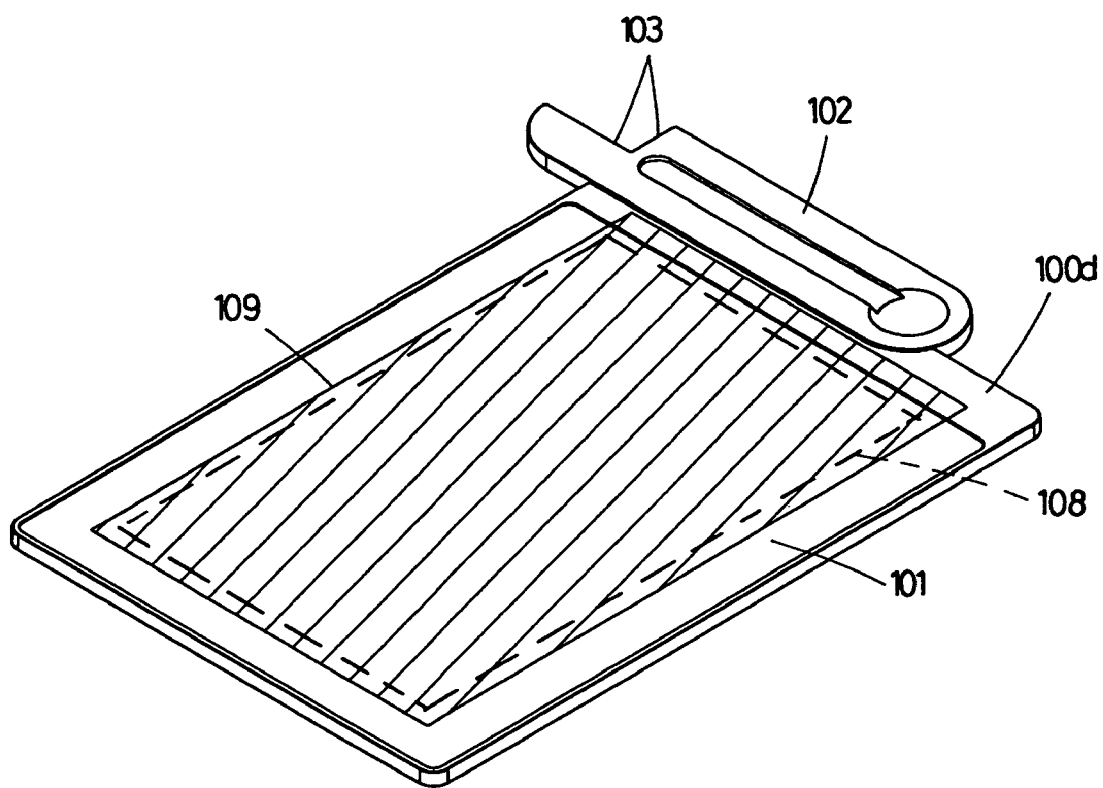
FIG. 15 is a perspective view of still further another form of the stage.

The stage 100a as shown in FIG. 12 includes a whiteboard 105 serving as the placement surface 101. The stage 100b as shown in FIG. 13 has a backlight illumination 106 provided on the placement surface 101. The stage 100c as shown in FIG. 14 includes stage members 107a and 107b connected to each other by hinges (not shown). The stage 100d as shown in FIG. 15 is used in the case where a shine material 108 is to be presented. In this case, an attached antireflective sheet 109 is covered.

The coupling of the positioner 7 and the positioned member 102 may be executed by fitting of a protrusion of the dovetail tenon type in a dovetail groove which are coupled together in the relation of male and female. Furthermore, the positioned member 102 may be attachable to and detachable from each of the stages 100a to 100d, whereupon a single positioned member can commonly be used.

According to the above-described visual presenter, when the body 2 is coupled to any of the separate stages 100a to 100d in use, the positioned member 102 of each stage 100a to 100d is coupled to the positioner 7 of the base 3 by an attraction force of the magnet. As a result, the right-angled corner of the base 3 and the estimation portion 103 are combined together thereby to be positioned. The placement surface 101 of each stage 100a to 100d correspond to each other within an imaging range of the imaging camera 17 in the normal state of the body 2, and the right-angled corner of the base 3 and the estimation portion 103 are positioned so that the center of the placement surface 101 and the center of the imaging camera 17 correspond with each other. Accordingly, since each stage 100a to 100d can be positioned relative to the base 3, the usability of the visual presenter 1 can be improved. Furthermore, since the positioning is carried out by the attraction force of the magnet, the base 3 and each stage 100a to 100d can be coupled easily and quickly.

Additionally, the placement surface 101 is comprised of the whiteboard 105 in the use of the stage 100a. The stage 100b is provided with the backlight illumination 106 in the use of the stage 100b. The stage 100c is foldable. Thus, the stages can be used properly according to the usages.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A visual presenter comprising:
   a body including a base and a support column on which an imaging camera is mounted;
   a stage which is separate from the body and is provided with a placement surface on which a material to be presented is placed;
   a positioner provided on the base;
   a positioned member provided on the stage so as to be coupled to the positioner so that the placement surface falls within an image range of the imaging camera; and wherein
   said body is detachably coupled to said stage; and
   a magnet generating an attraction force coupling the positioned member to the positioner.

2. The visual presenter according to claim 1, further comprising a backlight illuminating the placement surface of the stage from behind the placement surface.

3. The visual presenter according to claim 2, wherein the stage is foldable.

4. The visual presenter according to claim 1, wherein the placement surface comprises a whiteboard.

5. The visual presenter according to claim 4, wherein the stage is foldable.

6. The visual presenter according to claim 1, wherein the stage is foldable.

* * * * *